US012607149B2

(12) United States Patent
Ketterer et al.

(10) Patent No.: US 12,607,149 B2
(45) Date of Patent: Apr. 21, 2026

(54) SYSTEMS AND METHODS FOR EXHAUST GAS COMPOSITION MANAGEMENT DURING STOCHASTIC PRE-IGNITION MITIGATION

(71) Applicant: GM GLOBAL TECHNOLOGY OPERATIONS LLC, Detroit, MI (US)

(72) Inventors: Justin Edward Ketterer, LaSalle (CA); Ian Alexander May, Rochester Hills, MI (US); Danish Patel, Farmington Hills, MI (US); Lynn A. Totten, Haslett, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 2 days.

(21) Appl. No.: 18/823,469

(22) Filed: Sep. 3, 2024

(65) Prior Publication Data

US 2026/0063082 A1 Mar. 5, 2026

(51) Int. Cl.
*F02D 13/02* (2006.01)
*F02D 41/30* (2006.01)

(52) U.S. Cl.
CPC ......... *F02D 13/0215* (2013.01); *F02D 41/30* (2013.01)

(58) Field of Classification Search
CPC ............................ F02D 13/0215; F02D 41/30
See application file for complete search history.

(56) References Cited

FOREIGN PATENT DOCUMENTS

| | | | | | |
|---|---|---|---|---|---|
| CN | 109931170 | A | * | 6/2019 | ................ F02B 1/14 |
| CN | 112177782 | A | * | 1/2021 | ........... F02D 35/027 |
| DE | 102017105392 | A1 | * | 11/2017 | ............. F02D 41/38 |
| DE | 102016220659 | A1 | * | 4/2018 | ............. F02D 35/02 |
| EP | 0810362 | A2 | * | 12/1997 | ........... F02D 35/023 |
| JP | 2012145040 | A | | 8/2012 | |
| JP | 2016125350 | A | | 7/2016 | |
| WO | WO-2013114585 | A1 | * | 8/2013 | ........... F02D 41/024 |

* cited by examiner

*Primary Examiner* — Hung Q Nguyen
(74) *Attorney, Agent, or Firm* — Ingrassia Fisher & Lorenz, LLP | IF&L

(57) ABSTRACT

Combustion event data is received from at least one combustion event sensor associated with a plurality of cylinders. Each cylinder includes a combustion chamber, an intake valve, and an exhaust valve. Opening the intake valve allows a flow of air from an intake manifold into the combustion chamber. Opening the exhaust valve allows a flow of air from the combustion chamber to an exhaust manifold. When a determination is made that an SPI event has occurred in at least one of the cylinders based on the combustion event data, a command is issued to a variable valve timing (VVT) system to implement a valve timing overlap for each of the plurality of cylinders, wherein the intake valve and the exhaust valve of the cylinder are simultaneously placed in the open positions during the valve timing overlap.

20 Claims, 5 Drawing Sheets

SYSTEMS AND METHODS FOR EXHAUST GAS COMPOSITION MANAGEMENT DURING STOCHASTIC PRE-IGNITION MITIGATION

INTRODUCTION

The technical field generally relates to vehicles, and more particularly relates to systems and methods for exhaust gas composition management during stochastic pre-ignition mitigation.

A stochastic pre-ignition (SPI) event (also known as a low-speed pre-ignition (LSPI) event or a "superknock" event) is a combustion event that occurs when an air-fuel mixture introduced into a cylinder of an internal combustion engine (ICE) ignites before a spark plug fires. An SPI event typically occurs due to high temperature/pressure at the end of compression. Turbocharged direct fuel injection vehicles operating under low-speed and high-load driving conditions may experience SPI events. SPI events may also be initiated by oil droplets that serve as an initiating point of combustion, where the SPI event would be a function of temperature/pressure/time as opposed to hot spot pre-ignition. In some cases, SPI events may occur due to localized pockets of high enthalpy within an air-fuel mixture.

Extra fuel is often injected into the cylinders to create a rich air-fuel mixture to mitigate SPI events ending further SPI events during enrichment. The extra fuel in the rich air-fuel mixture typically lowers in-cylinder temperatures due to the latent heat of vaporization. As a result, flame temperatures are lower, exhaust gas temperatures are lower and consequently, residual gas temperatures are lower. However, the combustion of rich air-fuel mixtures typically result in the generation of rich exhaust gases and may result in elevated emissions.

Accordingly, it is desirable to provide systems and methods for exhaust gas composition management during stochastic pre-ignition mitigation. Other desirable features and characteristics will become apparent from the subsequent detailed description and the appended claims, taken in conjunction with the accompanying drawings and the foregoing technical field and background.

SUMMARY

A method of managing exhaust gas composition includes receiving combustion event data from at least one combustion event sensor associated with a plurality of cylinders, wherein each of the plurality of cylinders includes: a combustion chamber; an intake valve configured to be placed in one of an open position to enable a first flow of air from an intake manifold to the combustion chamber and a closed position to disable the first flow of air from the intake manifold to the combustion chamber; and an exhaust valve configured to be placed in one of an open position to enable a second flow of air from the combustion chamber to an exhaust manifold and a closed position to disable the second flow of air from the combustion chamber to the exhaust manifold. The method further includes: determining whether an SPI event has occurred in at least one of the plurality of cylinders based on the combustion event data; and issuing a first command to a variable valve timing (VVT) system to implement a valve timing overlap for each of the plurality of cylinders, wherein the intake valve and the exhaust valve of the cylinder are simultaneously placed in the open positions during the valve timing overlap.

In at least one embodiment, an inducted air volume enters the combustion chamber of each of the cylinders from the intake manifold via the associated intake valve and a bypass portion of the inducted air volume passes through the combustion chamber into the exhaust manifold via the associated exhaust valve during the valve timing overlap.

In at least one embodiment, the method further includes issuing a second command to the VVT system to close the exhaust valve of each of the cylinders following the valve timing overlap causing a trapped portion of the inducted air volume to remain in the combustion chamber of the cylinder, wherein the trapped portion of the inducted air volume is less than a default air volume used during a normal combustion process.

In at least one embodiment, the method further includes issuing a third command to a fuel injection system to inject a default fuel amount associated with the normal combustion process into the combustion chambers of each of the cylinders, wherein a combination of the trapped portion of the inducted air volume and the default fuel amount creates a rich air-fuel mixture, the rich air-fuel mixture being richer than a default air-fuel mixture created by a combination of the default air volume and the default fuel amount used during the normal combustion process.

In at least one embodiment, the method further includes issuing a fourth command to the VVT system to open the exhaust valve of each of the cylinders following combustion of the rich air-fuel mixture in the combustion chamber of the cylinder to enable exhaust gases generated by the combustion of the rich air-fuel to flow from the combustion chamber into the exhaust manifold via the associated exhaust valve and combine with the bypass portion of the inducted air volume generated by at least one of the plurality of cylinders in the exhaust manifold to create a stoichiometric exhaust gas composition.

In at least one embodiment, the method further includes issuing the first command to the variable valve timing (VVT) system to maintain the valve timing overlap during twenty consecutive 360° crankshaft rotations of a crankshaft of the vehicle.

In at least one embodiment, the method further includes: receiving updated combustion event data from the at least one combustion event sensor following the twenty consecutive 360° crankshaft rotations; determining whether the SPI event has been resolved based on the updated combustion event data; and issuing a fifth command to the VVT system to gradually transition from the valve timing overlap to a default timing associated with a normal combustion process over a pre-defined number of consecutive crankshaft rotations based on the determination.

A system for managing exhaust gas composition includes at least one processor and at least one memory communicatively coupled to the at least one processor. The at least one memory includes instructions that upon execution by the at least one processor, causes the at least one processor to receive combustion event data from at least one combustion event sensor associated with a plurality of cylinders, wherein each of the plurality of cylinders includes: a combustion chamber; an intake valve configured to be placed in one of an open position to enable a first flow of air from an intake manifold to the combustion chamber and a closed position to disable the first flow of air from the intake manifold to the combustion chamber; and an exhaust valve configured to be placed in one of an open position to enable a second flow of air from the combustion chamber to an exhaust manifold and a closed position to disable the second flow of air from the combustion chamber to the exhaust manifold. The at least one memory includes instructions that upon execution by the at least one processor, causes the at least one processor to: determine whether an SPI event has occurred in at least one of the plurality of cylinders based on the combustion event data; and issue a first command to a variable valve timing (VVT) system to implement a valve timing overlap for each of the plurality of cylinders, wherein the intake valve and the exhaust valve of the cylinder are simultaneously placed in the open positions during the valve timing overlap.

In at least one embodiment, an inducted air volume enters the combustion chamber of each of the cylinders from the intake manifold via the associated intake valve and a bypass portion of the inducted air volume passes through the combustion chamber into the exhaust manifold via the associated exhaust valve during the valve timing overlap.

In at least one embodiment, the at least one memory further includes instructions that upon execution by the at least one processor, causes the at least one processor to issue a second command to the VVT system to close the exhaust valve of each of the cylinders following the valve timing overlap causing a trapped portion of the inducted air volume to remain in the combustion chamber of the cylinder, wherein the trapped portion of the inducted air volume is less than a default air volume used during a normal combustion process.

In at least one embodiment, the at least one memory further includes instructions that upon execution by the at least one processor, causes the at least one processor to issue a third command to a fuel injection system to inject a default fuel amount associated with the normal combustion process into the combustion chambers of each of the cylinders, wherein a combination of the trapped portion of the inducted air volume and the default fuel amount creates a rich air-fuel mixture, the rich air-fuel mixture being richer than a default air-fuel mixture created by a combination of the default air volume and the default fuel amount used during the normal combustion process.

In at least one embodiment, the at least one memory further includes instructions that upon execution by the at least one processor, causes the at least one processor to issue a fourth command to the VVT system to open the exhaust valve of each of the cylinders following combustion of the rich air-fuel mixture in the combustion chamber of the cylinder to enable exhaust gases generated by the combustion of the rich air-fuel to flow from the combustion chamber into the exhaust manifold via the associated exhaust valve and combine with the bypass portion of the inducted air volume generated by at least one of the plurality of cylinders in the exhaust manifold to create a stoichiometric exhaust gas composition.

In at least one embodiment, the at least one memory further includes instructions that upon execution by the at least one processor, causes the at least one processor to issue the first command to the variable valve timing (VVT) system to maintain the valve timing overlap during twenty consecutive 360° crankshaft rotations of a crankshaft of the vehicle.

In at least one embodiment, the at least one memory further includes instructions that upon execution by the at least one processor, causes the at least one processor to: receive updated combustion event data from the at least one combustion event sensor following the twenty consecutive 360° crankshaft rotations; determine whether the SPI event has been resolved based on the updated combustion event data; and issue a fifth command to the VVT system to gradually transition from the valve timing overlap to a default timing associated with a normal combustion process over a pre-defined number of consecutive crankshaft rotations based on the determination.

A vehicle includes at least one processor; and at least one memory communicatively coupled to the at least one processor. The at least one memory includes instructions that upon execution by the at least one processor, causes the at least one processor to receive combustion event data from at least one combustion event sensor associated with a plurality of cylinders, wherein each of the plurality of cylinders includes: a combustion chamber; an intake valve configured to be placed in one of an open position to enable a first flow of air from an intake manifold to the combustion chamber and a closed position to disable the first flow of air from the intake manifold to the combustion chamber; and an exhaust valve configured to be placed in one of an open position to enable a second flow of air from the combustion chamber to an exhaust manifold and a closed position to disable the second flow of air from the combustion chamber to the exhaust manifold. The at least one memory includes instructions that upon execution by the at least one processor, causes the at least one processor to: determine whether an SPI event has occurred in at least one of the plurality of cylinders based on the combustion event data; and issue a first command to a variable valve timing (VVT) system to implement a valve timing overlap for each of the plurality of cylinders, wherein the intake valve and the exhaust valve of the cylinder are simultaneously placed in the open positions during the valve timing overlap.

In at least one embodiment, an inducted air volume enters the combustion chamber of each of the cylinders from the intake manifold via the associated intake valve and a bypass portion of the inducted air volume passes through the combustion chamber into the exhaust manifold via the associated exhaust valve during the valve timing overlap.

In at least one embodiment, the at least one memory further includes instructions that upon execution by the at least one processor, causes the at least one processor to issue a second command to the VVT system to close the exhaust valve of each of the cylinders following the valve timing overlap causing a trapped portion of the inducted air volume to remain in the combustion chamber of the cylinder, wherein the trapped portion of the inducted air volume is less than a default air volume used during a normal combustion process.

In at least one embodiment, the at least one memory further includes instructions that upon execution by the at least one processor, causes the at least one processor to issue a second command to issue a third command to a fuel injection system to inject a default fuel amount associated with the normal combustion process into the combustion chambers of each of the cylinders, wherein a combination of the trapped portion of the inducted air volume and the default fuel amount creates a rich air-fuel mixture, the rich air-fuel mixture being richer than a default air-fuel mixture created by a combination of the default air volume and the default fuel amount used during the normal combustion process.

In at least one embodiment, the at least one memory further includes instructions that upon execution by the at least one processor, causes the at least one processor to issue a second command to issue a fourth command to the VVT system to open the exhaust valve of each of the cylinders following combustion of the rich air-fuel mixture in the combustion chamber of the cylinder to enable exhaust gases generated by the combustion of the rich air-fuel to flow from the combustion chamber into the exhaust manifold via the associated exhaust valve and combine with the bypass portion of the inducted air volume generated by at least one of the plurality of cylinders in the exhaust manifold to create a stoichiometric exhaust gas composition.

In at least one embodiment, the at least one memory further includes instructions that upon execution by the at least one processor, causes the at least one processor to issue a second command to: issue the first command to the variable valve timing (VVT) system to maintain the valve timing overlap during twenty consecutive 360° crankshaft rotations of a crankshaft of the vehicle; receive updated combustion event data from the at least one combustion event sensor following the twenty consecutive 360° crankshaft rotations; determine whether the SPI event has been resolved based on the updated combustion event data; and issue a fifth command to the VVT system to gradually transition from the valve timing overlap to a default timing associated with a normal combustion process over a predefined number of consecutive crankshaft rotations based on the determination.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
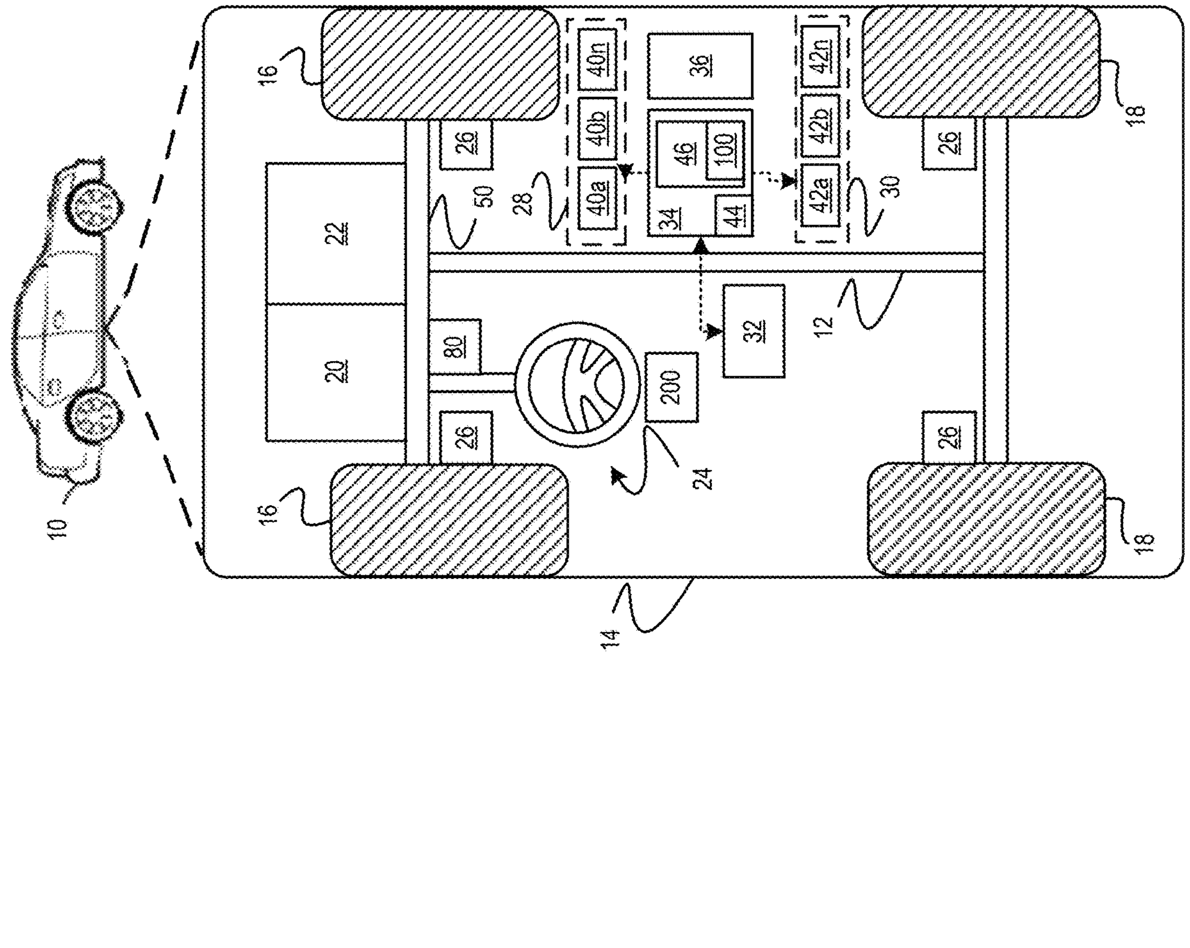
FIG. 1 is a functional block diagram of a vehicle including an exhaust gas composition management system in accordance with at least one embodiment.

Referring to FIG. 1, a functional block diagram of a vehicle including an exhaust gas composition management system 100 in accordance with at least one embodiment is shown. The vehicle 10 generally includes a chassis 12, a body 14, front wheels 16, and rear wheels 18. While the vehicle 10 is depicted in the illustrated embodiment as a passenger car, the vehicle 10 may be other types of vehicles including trucks, sport utility vehicles (SUVs), crossover vehicles (CUV), and recreational vehicles (RVs).

In various embodiments, the body 14 is arranged on the chassis 12 and substantially encloses components of the vehicle 10. The body 14 and the chassis 12 may jointly form a frame. The wheels 16, 18 are each rotationally coupled to the chassis 12 near a respective corner of the body 14.

In various embodiments, the vehicle 10 is an autonomous or semi-autonomous vehicle that is automatically controlled to carry passengers and/or cargo from one place to another. For example, in an exemplary embodiment, the vehicle 10 is a so-called Level Two, Level Three, Level Four or Level Five automation system. Level two automation means the vehicle assists the driver in various driving tasks with driver supervision. Level three automation means the vehicle can take over all driving functions under certain circumstances. All major functions are automated, including braking, steering, and acceleration. At this level, the driver can fully disengage until the vehicle tells the driver otherwise. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the vehicle 10 generally includes a propulsion system 20 a transmission system 22, a steering system 24, a braking system 26, a sensor system 28, an actuator system 30, at least one data storage device 32, at least one controller 34, and a communication system 36. The controller 34 is configured to implement an automated driving system (ADS). The propulsion system 20 is configured to generate power to propel the vehicle. The propulsion system 20 may, in various embodiments, include an internal combustion engine (ICE). The transmission system 22 is configured to transmit power from the propulsion system 20 to the vehicle wheels 16, 18 according to selectable speed ratios. According to various embodiments, the transmission system 22 may include a step-ratio automatic transmission, a continuously-variable transmission, or other appropriate transmission. The braking system 26 is configured to provide braking torque to the vehicle wheels 16, 18. The braking system 26 may, in various embodiments, include friction brakes, brake by wire, a regenerative braking system such as an electric machine, and/or other appropriate braking systems.

The steering system 24 is configured to influence a position of the of the vehicle wheels 16. While depicted as including a steering wheel and steering column, for illustrative purposes, in some embodiments contemplated within the scope of the present disclosure, the steering system 24 may not include a steering wheel and/or steering column. The steering system 24 includes a steering column coupled to an axle 50 associated with the front wheels 16 through, for example, a rack and pinion or other mechanism (not shown). Alternatively, the steering system 24 may include a steer by wire system that includes actuators associated with each of the front wheels 16.

The sensor system 28 includes one or more sensing devices 40*a*-40*n* that sense observable conditions of the exterior environment and/or the interior environment of the vehicle 10. The sensing devices 40*a*-40*n* can include, but are not limited to, radars, lidars, global positioning systems, optical cameras, thermal cameras, ultrasonic sensors, a steering wheel sensor, and/or other sensors.

The vehicle dynamics sensors provide vehicle dynamics data including longitudinal speed, yaw rate, lateral acceleration, longitudinal acceleration, etc. The vehicle dynamics sensors may include wheel sensors that measure information pertaining to one or more wheels of the vehicle 10. In one embodiment, the wheel sensors comprise wheel speed sensors that are coupled to each of the wheels 16, 18 of the vehicle 10. Further, the vehicle dynamics sensors may include one or more accelerometers (provided as part of an Inertial Measurement Unit (IMU)) that measure information pertaining to an acceleration of the vehicle 10. In various embodiments, the accelerometers measure one or more acceleration values for the vehicle 10, including latitudinal and longitudinal acceleration and yaw rate. In at least one embodiment, the vehicle dynamic sensors provide vehicle movement data.

The actuator system 30 includes one or more actuator devices 42*a*-42*n* that control one or more vehicle features such as, but not limited to, one or more vehicle wheels 16, 18 the propulsion system 20, the transmission system 22, the steering system 24, and the braking system 26. In various embodiments, the vehicle features can further include interior and/or exterior vehicle features such as, but are not limited to, doors, a trunk, and cabin features such as air, music, lighting, etc. (not numbered).

The communication system 36 is configured to wirelessly communicate information to and from other entities 48, such as but not limited to, other vehicles ("V2V" communication,) infrastructure ("V2I" communication), remote systems, and/or personal devices. In an exemplary embodiment, the communication system 36 is a wireless communication system configured to communicate via a wireless local area network (WLAN) using IEEE 802.11 standards or by using cellular data communication. However, additional, or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in the ADS of the vehicle 10. In various embodiments, the data storage device 32 stores defined maps of the navigable environment. In various embodiments, the defined maps may be predefined by and obtained from a remote system. For example, the defined maps may be assembled by the remote system and communicated to the vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMS (electrically PROM), EEPROMs (electrically erasable PROM), flash memory, or any other electric, magnetic, optical, or combination memory devices capable of storing data, some of which represent executable instructions, used by the controller 34 in controlling the vehicle 10. In at least one embodiment, the computer-readable storage device 46 is at least one memory configured to store the exhaust gas composition management system 100.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10. In various embodiments, the controller(s) 34 are configured to implement ADS.

Figure 2:
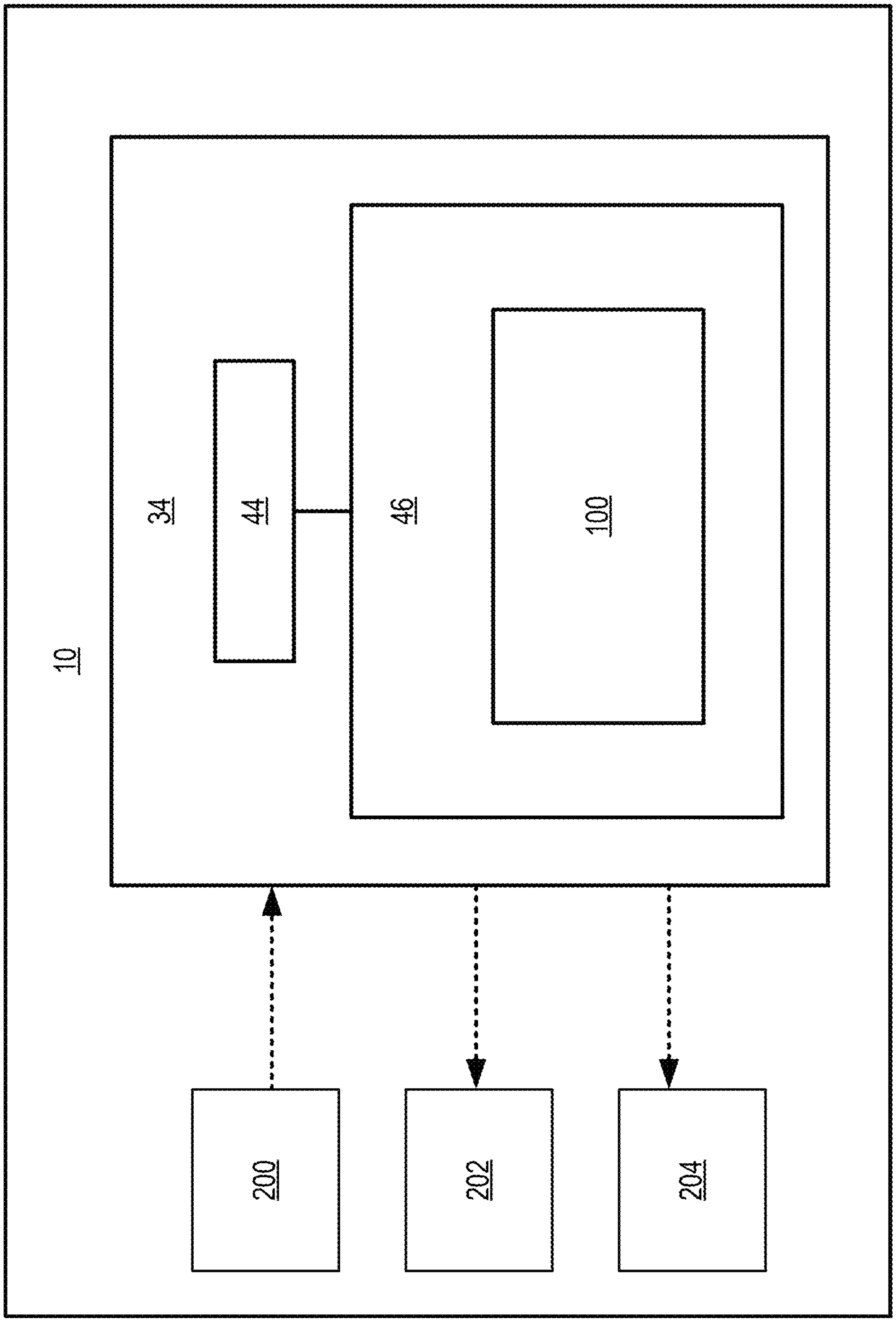
FIG. 2 is a functional block diagram of a controller including an exhaust gas composition management system in accordance with at least one embodiment.

Referring to FIG. 2, a functional block diagram of a controller 34 including an exhaust gas composition management system 100 in accordance with at least one embodiment is shown. The controller 34 includes at least one processor 44 and at least one memory 46. The at least one processor 44 is a programable device that includes one or more instructions stored in or associated with the at least one memory 46. The at least one memory 46 includes instructions that the at least one processor 44 is configured to execute. The at least one memory 46 includes an embodiment of the exhaust gas composition management system 100 that is configured to manage exhaust gas composition during stochastic pre-ignition (SPI) mitigation.

The controller 34 is configured to be communicatively coupled to at least one combustion event sensor 200. The vehicle 10 includes a plurality of cylinders (not shown). The combustion event sensor(s) 200 is associated with the plurality of cylinders. In at least one embodiment, each combustion sensor 200 is associated with at least two cylinders. In at least one embodiment, each combustion sensor 200 is associated with four cylinders. The controller 34 is configured to receive combustion event data from the combustion event sensor(s) 200. In at least one embodiment, the combustion event sensor(s) 200 are knock sensors. In at least one embodiment, the combustion event sensor(s) 200 are production versions of cylinder pressure sensors. The controller 34 is configured to determine whether an SPI event has occurred in a cylinder based on the combustion event data received from the combustion event sensor(s) 200.

The controller 34 is configured to be communicatively coupled to a variable valve timing (VVT) system 202. Each cylinder is fluidly coupled to an intake manifold via an intake valve and an exhaust manifold via an exhaust valve. The VVT system 202 is configured to manage and adjust the timing of the opening and closing of the intake valve and the exhaust valve of the individual cylinders. The opening and closing of a valve is also referred to as a valve lift event. The controller 34 is configured to be communicatively coupled to a fuel injection system 204. The fuel injection system 204 manages the injection of fuel into the cylinders. The operation of the exhaust gas composition management system 100 will be described in further detail below.

Figure 3:
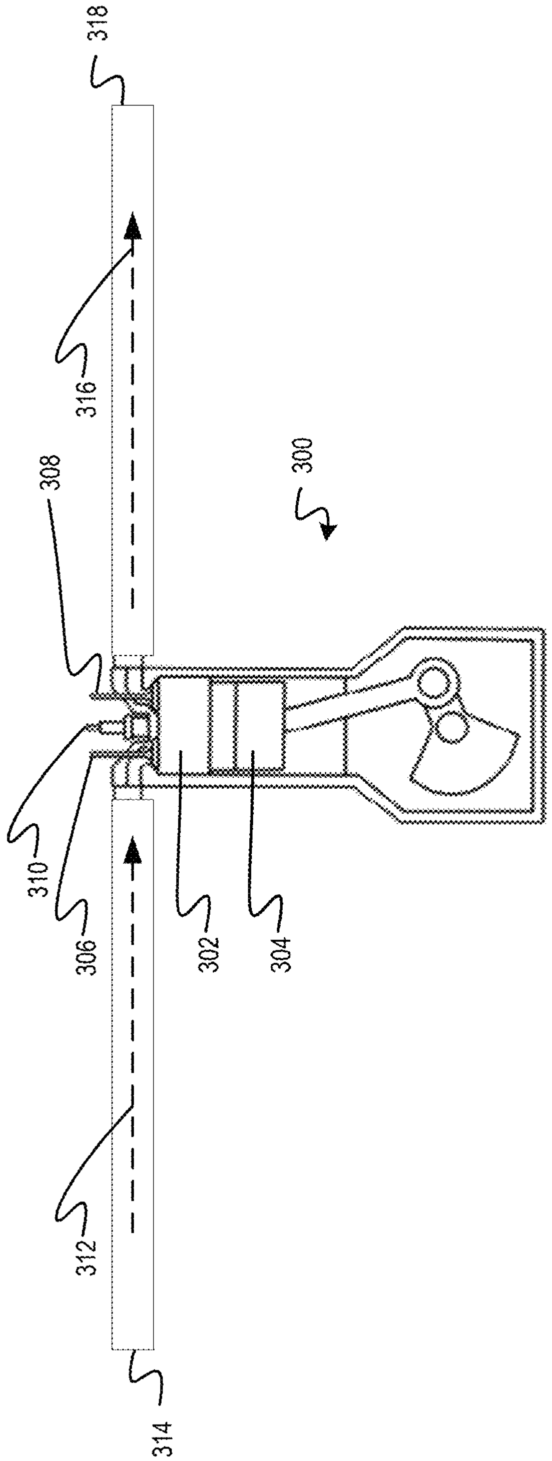
FIG. 3 is a functional block diagram of a cylinder in accordance with at least one embodiment.

Referring to FIG. 3, a functional block diagram of a cylinder 300 in accordance with at least one embodiment is shown. The exhaust gas composition management system 100 is configured to manage the composition of exhaust gases generated by the cylinder 300 during SPI mitigation in response to detection of an SPI event at the cylinder 300. The cylinder 300 includes a combustion chamber 302, a piston 304, an intake valve 306, an exhaust valve 308, and a fuel injector 310.

The intake valve 306 can be placed in one of an open position and a closed position. When the intake valve 306 is placed in the open position, an air flow 312 is enabled from an intake manifold 314 of the vehicle 10 to the combustion chamber 302. When the intake valve 306 is placed in the closed position, the air flow 312 from the intake manifold 314 to the combustion chamber 302 is disabled. The exhaust valve 308 can be placed in one of an open position and a closed position. When the exhaust valve 308 is placed in the open position, an air flow 316 is enabled from the combustion chamber 302 to an exhaust manifold 316 of the vehicle 10. When the exhaust valve 308 is placed in the closed position, the air flow 316 from the combustion chamber 302 to the exhaust manifold 316 is disabled. A combustion event sensor(s) 200 (not shown) is configured to sense combustion event data associated with the cylinder 300.

A vehicle 10 includes a plurality of cylinders 300. A VVT system 202 manages the timing associated with the opening and closing of the intake valves 306 and the exhaust valves 308 of individual cylinders 300. The VVT system 202 implements a default timing associated with the opening and closing of the intake valves 306 and the exhaust valves 308 of individual cylinders 300 during a normal combustion process. When the exhaust gas composition management system 100 detects an occurrence of an SPI event in one of the cylinders 300, the exhaust gas composition management system 100 issues a command to the VVT system 202 to implement a valve timing overlap in all of the cylinders 300 during an SPI event mitigation process so that exhaust gas having a stoichiometric exhaust gas composition is generated and discharged from the vehicle 10 via the exhaust manifold 316.

Figure 4:
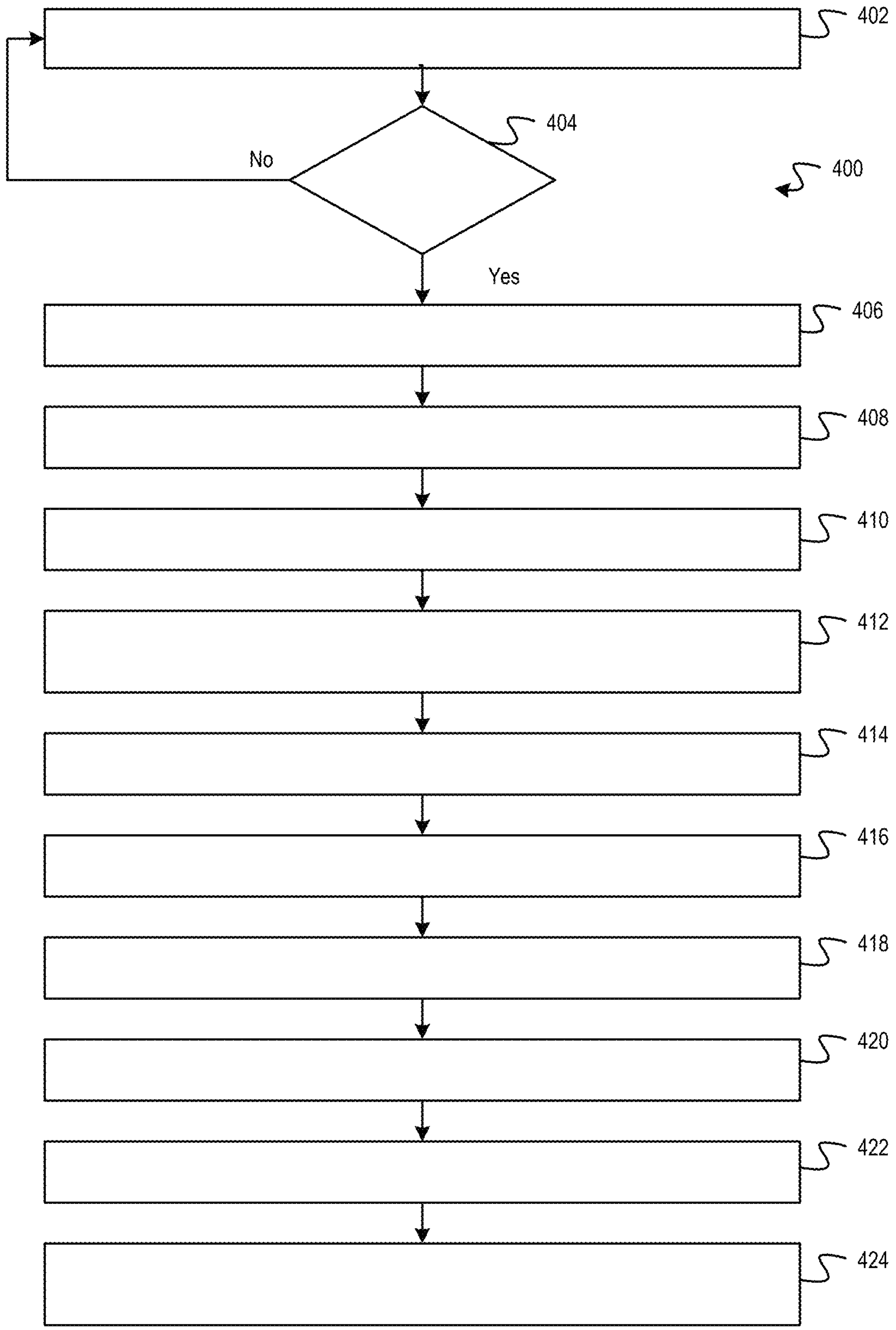
FIG. 4 is a flowchart representation of an exemplary method for managing exhaust gas composition during stochastic pre-ignition (SPI) mitigation in accordance with at least one embodiment.

Referring to FIG. 4, a flowchart representation of an exemplary method 400 for managing exhaust gas composition during stochastic pre-ignition (SPI) mitigation in accordance with at least one embodiment is shown. The method 400 will be described with reference to an exemplary implementation of an embodiment of an exhaust gas composition management system 100. As can be appreciated in light of the disclosure, the order of operation within the method 400 is not limited to the sequential execution as illustrated in FIG. 4 but may be performed in one or more varying orders as applicable and in accordance with the present disclosure.

At 402, the exhaust gas composition management system 100 receives combustion event data from the combustion event sensor(s) 200. A vehicle 10 includes a plurality of cylinders 300. The combustion event sensor(s) 200 are configured to receive combustion event data associated with the plurality of cylinders 300. In at least one embodiment, the combustion event sensor(s) 200 are knock sensors. At 404, the exhaust gas composition management system 100 determines whether an SPI event has occurred in one of the cylinders 300 based on the combustion event data received from the combustion event sensor(s) 200. If the exhaust gas composition management system 100 determines that an SPI event has not occurred in one of the cylinders 300, the method 400 returns to 402.

If the exhaust gas composition management system 100 determines that an SPI event has occurred in one of the cylinders 300, the exhaust gas composition management system 100 issues a command to a VVT system 202 to implement a valve timing overlap at 406. The VVT system 202 is configured to manage the timing associated with the opening and closing of the intake valves 306 and the exhaust valves 308 of individual cylinders 300. The VVT system 202 adjusts the timing so that the intake valve 306 and the exhaust valve 308 of the cylinders 300 are simultaneously placed in open positions during the valve timing overlap at 408.

Figure 5:
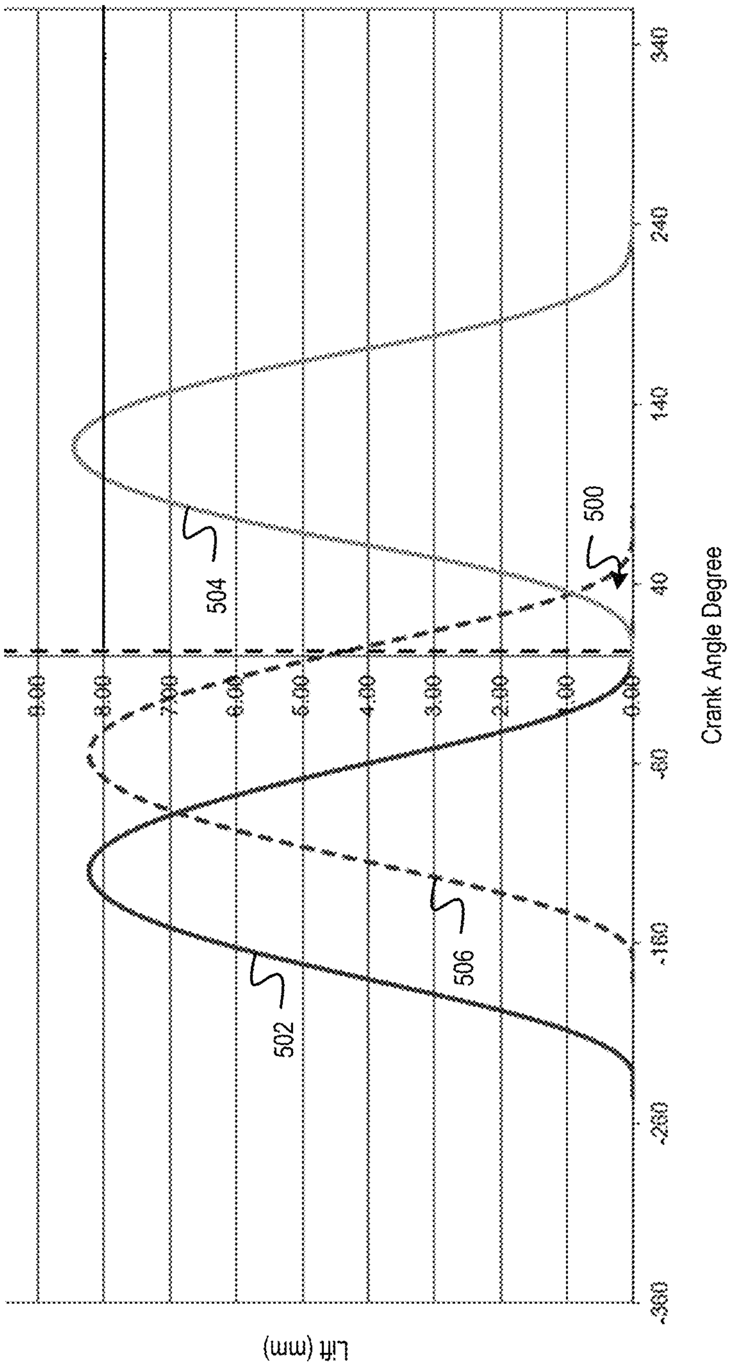
FIG. 5 is a graphical representation of a valve timing overlap in accordance with at least one embodiment.

Referring to FIG. 5, a graphical representation of a valve timing overlap 500 in accordance with at least one embodiment is shown. The x-axis of the graph represents crank angle degree and the y-axis of the graph represents lift in millimeters of an intake valve 306 and an exhaust valve 308 as a function of the crank angle degree in a cylinder 300. The curve 502 represents the lift of the exhaust valve 308 as a function of the crank angle degree during a normal combustion process. The curve 504 represents the lift of the intake valve 308 as a function of the crank angle degree during the normal combustion process. The curve 506 represents the lift of the intake valve 306 as a function of the crank angle degree during the implementation of a valve timing overlap 500. The curve 506 represents the exhaust valve lift in a more retarded phasing allowing overlap with the intake valve lift. There is also the option to phase the intake valve event 504 to phase earlier in this example, which can allow for more valve timing overlap, increasing the scavenging amount.

The timing of the intake valve 306 has been adjusted to generate the valve timing overlap 500. In at least one embodiment, the timing of the exhaust valve 308 can be adjusted to generate the valve timing overlap 500. In at least one embodiment, the timing of the intake valve 306 and the timing of the exhaust valve 308 can be adjusted to generate the valve timing overlap 500. During the valve timing overlap 500, the intake valve 306 and the exhaust valve 308 of the cylinder 300 are simultaneously placed in open positions. There is a continuum of open positions of the intake valve 306 and the exhaust valve 308 as a cam rotates, so neither the intake valve 306 nor the exhaust valve 308 will be fully open during the valve timing overlap. There will be some intermediate lift of the intake valve 306 and of the exhaust valve 308. During the valve timing overlap 500, both the intake value 306 and the exhaust valve 308 share an overlapping open time. The SPI event mitigation strategy implements the degree of valve timing overlap 500 between the intake value 306 and the exhaust valve 308 to increase scavenge air into the exhaust thereby enriching the trapped in-cylinder air-fuel mixture.

Referring back to FIG. 4, after the intake valve 306 and the exhaust valve 308 are simultaneously placed in the open positions, an inducted air volume enters the combustion chamber 302 from the intake manifold 314 via the open intake valve 306 at 410. At 412, a bypass portion of the inducted air volume passes through the combustion chamber 302 into the exhaust manifold 318 via the open exhaust valve 308. At 414, the exhaust gas composition management system 100 issues a command to the VVT system 202 to close the intake valve 306 and the exhaust valve 308. The exhaust valve 308 is closed first and the intake valve 306 remains open to complete the intake stroke. When the intake valve 306 and the exhaust valve 308 are placed in the closed position, a trapped portion of the inducted air volume remains in the combustion chamber 302 at 416. During a normal combustion process, the VVT system 202 implements a timing of the opening and closing of the intake valve 306 and the exhaust valve 308 that results in a default air volume remaining in the combustion chamber 302 for use in the combustion process. The trapped portion of the inducted air volume in the combustion chamber 302 is less than the default air volume. In at least one embodiment, the total inducted air volume is equal to the default air volume. The sum of the bypass portion of the inducted air volume in the exhaust manifold 318 and the trapped portion of the inducted air volume in the combustion chamber 302 is equal to the default air volume. In at least one embodiment the sum of the bypass portion of the inducted air volume in the exhaust manifold 318 and the trapped portion of the inducted air volume in the combustion chamber 302 varies based on the air needed to be trapped in the cylinder 300 to maintain engine load within some tolerance band. The trapped portion of the inducted air volume in the combustion chamber 302 is used during the combustion process during the SPI mitigation process. The engine controller unit (ECU) will typically fuel based on what is being read by a mass air flow sensor upstream of the intake manifold 314 under normal operation, wherein the default air volume is based on the reading provided by the mass air flow sensor.

At 418, the exhaust gas composition management system 100 issues a command to the fuel injection system 204 to inject the default fuel amount used during the normal combustion process into the combustion chamber 302 of the cylinder 300. During the normal combustion process, the default air volume combines with the default fuel amount to generate a normal air-fuel mixture. Since the trapped portion of the inducted air volume is less than the default air volume, the combination of the default fuel amount and the trapped portion of the inducted air volume yields a rich air-fuel mixture that is richer than the normal air-fuel mixture.

At 420, combustion of the rich air-fuel mixture occurs in the combustion chamber 302 of the cylinder. The combustion of rich air-fuel mixtures are typically used to mitigate SPI events in cylinders 300. The combustion of rich air-fuel mixtures typically generate rich exhaust gases that fail to meet stoichiometric exhaust gas composition metrics that are important for meeting emission limits.

At 422, the exhaust gas composition management system 100 issues a command to the VVT system 202 to open the exhaust valve 308 of the cylinder 300. The rich exhaust gases generated during the combustion of the rich air-fuel mixture flow from the combustion chamber 302 of the cylinder 300 into the exhaust manifold 318 via the open exhaust valve 308. At 424, the rich exhaust gases mix with the bypass portions of the inducted air volumes associated with one or more of the cylinders 300 in the exhaust manifold 318 to create a stoichiometric exhaust gas composition for discharge via an exhaust system of the vehicle 10. The bypass portions of the inducted air volumes in the exhaust manifold 318 dilutes the rich exhaust gases generated by the combustion of the rich air-fuel mixture to create the stoichiometric exhaust gas composition. The stoichiometric exhaust gas composition is processed by a catalytic converter prior to being discharged from the vehicle 10.

In at least one embodiment, the exhaust gas composition management system 100 issues a command to the VVT system 202 to maintain the valve timing overlap 500 during twenty consecutive 360° crankshaft rotations of a crankshaft of the vehicle 10. The exhaust gas composition management system 100 receives updated combustion event data from the combustion event sensor(s) 200 following the twenty consecutive 360° crankshaft rotations. The exhaust gas composition management system 100 determines whether the SPI event has been resolved based on the updated combustion event data.

If the exhaust gas composition management system 100 determines that the SPI event has been resolved, the exhaust gas composition management system 100 issues a command to the VVT system 202 to gradually transition from the valve timing overlap 500 to the default timing associated with the normal combustion process over a pre-defined number of consecutive crankshaft rotations. If the exhaust gas composition management system 100 determines that the SPI event has not been resolved, the valve timing overlap 500 is maintained during another twenty consecutive 360° crankshaft rotations of the crankshaft of the vehicle 10.

The twenty consecutive 360° crankshaft rotations of the crankshaft constitute 10 ten cycles. In alternative embodiments, the exhaust gas composition management system 100 may issue a command to the VVT system 202 to maintain the valve timing overlap 500 during a different number of consecutive 360° crankshaft rotations of the crankshaft of the vehicle 10. In at least one embodiment, the number of consecutive 360° crankshaft rotations of the crankshaft that the valve timing overlap 500 is maintained for is calibrated. In at least one embodiment, the exhaust gas composition management system 100 may issue a command to the VVT system 202 to maintain the valve timing overlap 500 during a pre-defined number of consecutive 360° crankshaft rotations of the crankshaft of the vehicle 10.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of managing exhaust gas composition comprising:

receiving combustion event data from at least one combustion event sensor associated with a plurality of cylinders, wherein each of the plurality of cylinders comprises:

a combustion chamber;

an intake valve configured to be placed in one of an open position to enable a first flow of air from an intake manifold to the combustion chamber and a closed position to disable the first flow of air from the intake manifold to the combustion chamber; and an exhaust valve configured to be placed in one of an open position to enable a second flow of air from the combustion chamber to an exhaust manifold and a closed position to disable the second flow of air from the combustion chamber to the exhaust manifold; and based on a determination that a Stochastic Pre-Ignition (SPI) event has occurred in at least one of the plurality of cylinders based on the combustion event data;

issuing a first command to a variable valve timing (VVT) system to implement a valve timing overlap for each of the plurality of cylinders and maintain the valve timing overlap during twenty consecutive 360° crankshaft rotations of a crankshaft of the vehicle, wherein:

the intake valve and the exhaust valve of the cylinder are simultaneously placed in the open positions during the valve timing overlap;

an inducted air volume enters the combustion chamber of each of the plurality of cylinders from the intake manifold via the associated intake valve and a bypass portion of the inducted air volume passes through the combustion chamber into the exhaust manifold via the associated exhaust valve during the valve timing overlap; and a timing of the exhaust valve is adjusted to a retarded phase having a crank angle of −160° and a maximum lift between 8 millimeters and 9 millimeters to enable a valve overlap having a lift of less than 1 millimeter;

issuing a second command to the VVT system to close the exhaust valve of each of the cylinders following the valve timing overlap causing a trapped portion of the inducted air volume to remain in the combustion chamber of the cylinder, wherein the trapped portion of the inducted air volume is less than a default air volume used during a normal combustion process;

issuing a third command to a fuel injection system to inject a default fuel amount associated with the normal combustion process into the combustion chambers of each of the cylinders, wherein a combination of the trapped portion of the inducted air volume and the default fuel amount creates a rich air-fuel mixture, the rich air-fuel mixture being richer than a default air-fuel mixture created by a combination of the default air volume and the default fuel amount used during the normal combustion process;

issuing a fourth command to the VVT system to open the exhaust valve of each of the cylinders following combustion of the rich air-fuel mixture in the combustion chamber of the cylinder to enable exhaust gases generated by the combustion of the rich air-fuel to flow from the combustion chamber into the exhaust manifold via the associated exhaust valve and combine with the bypass portion of the inducted air volume generated by at least one of the plurality of cylinders in the exhaust manifold to create a stoichiometric exhaust gas composition;

receiving updated combustion event data from the at least one combustion event sensor following the twenty consecutive 360° crankshaft rotations;

determining whether the SPI event has been resolved based on the updated combustion event data; and issuing a fifth command to the VVT system to gradually transition from the valve timing overlap to a default timing associated with a normal combustion process over a pre-defined number of consecutive crankshaft rotations based on the determination.

2. The method of claim 1, wherein, the timing of the exhaust valve is adjusted from a crank angle falling within a range of −260° to −210° to the retarded phase having the crank angle of −160°.

3. The method of claim 1, wherein the adjusted exhaust value has the maximum lift between 8 millimeters and 9 millimeters when the crank angle is −60°.

4. The method of claim 1, wherein the adjusted exhaust value has a lift between 4 millimeters and 5 millimeters when the crank angle is 0°.

5. The method of claim 1, wherein the valve timing overlap begins when the crank angle is 0°.

6. The method of claim 1, wherein the at least one combustion event sensor comprises at least one knock sensor.

7. The method of claim 1, wherein the at least one combustion event sensor comprises at least one cylinder pressure sensor.

8. A system for managing exhaust gas composition, comprising:

at least one processor; and at least one memory communicatively coupled to the at least one processor, the at least one memory comprising instructions that upon execution by the at least one processor, causes the at least one processor to:

receive combustion event data from at least one combustion event sensor associated with a plurality of cylinders, wherein each of the plurality of cylinders comprises:

a combustion chamber;

an intake valve configured to be placed in one of an open position to enable a first flow of air from an intake manifold to the combustion chamber and a closed position to disable the first flow of air from the intake manifold to the combustion chamber; and an exhaust valve configured to be placed in one of an open position to enable a second flow of air from the combustion chamber to an exhaust manifold and a closed position to disable the second flow of air from the combustion chamber to the exhaust manifold; and based on a determination a Stochastic Pre-Ignition (SPI) event has occurred in at least one of the plurality of cylinders based on the combustion event data;

issue a first command to a variable valve timing (VVT) system to implement a valve timing overlap for each of the plurality of cylinders and maintain the valve timing overlap during twenty consecutive 360° crankshaft rotations of a crankshaft of a vehicle, wherein:

the intake valve and the exhaust valve of the cylinder are simultaneously placed in the open positions during the valve timing overlap;

an inducted air volume enters the combustion chamber of each of the plurality of cylinders from the intake manifold via the associated intake valve and a bypass portion of the inducted air volume passes through the combustion chamber into the exhaust manifold via the associated exhaust valve during the valve timing overlap; and a timing of the exhaust valve is adjusted to a retarded phase having a crank angle of −160° and a maximum lift between 8 millimeters and 9 millimeters to enable a valve overlap having a lift of less than 1 millimeter;

issue a second command to the VVT system to close the exhaust valve of each of the cylinders following the valve timing overlap causing a trapped portion of the inducted air volume to remain in the combustion chamber of the cylinder, wherein the trapped portion of the inducted air volume is less than a default air volume used during a normal combustion process;

issue a third command to a fuel injection system to inject a default fuel amount associated with the normal combustion process into the combustion chambers of each of the cylinders, wherein a combination of the trapped portion of the inducted air volume and the default fuel amount creates a rich air-fuel mixture, the rich air-fuel mixture being richer than a default air-fuel mixture created by a combination of the default air volume and the default fuel amount used during the normal combustion process;

issue a fourth command to the VVT system to open the exhaust valve of each of the cylinders following combustion of the rich air-fuel mixture in the combustion chamber of the cylinder to enable exhaust gases generated by the combustion of the rich air-fuel to flow from the combustion chamber into the exhaust manifold via the associated exhaust valve and combine with the bypass portion of the inducted air volume generated by at least one of the plurality of cylinders in the exhaust manifold to create a stoichiometric exhaust gas composition;

receive updated combustion event data from the at least one combustion event sensor following the twenty consecutive 360° crankshaft rotations;

determine whether the SPI event has been resolved based on the updated combustion event data; and issue a fifth command to the VVT system to gradually transition from the valve timing overlap to a default timing associated with a normal combustion process over a pre-defined number of consecutive crankshaft rotations based on the determination.

9. The system of claim 8, wherein, the timing of the exhaust valve is adjusted from a crank angle falling within a range of −260° to −210° to the retarded phase having the crank angle of −160°.

10. The system of claim 8, wherein the adjusted exhaust value has the maximum lift between 8 millimeters and 9 millimeters when the crank angle is −60°.

11. The system of claim 8, wherein the adjusted exhaust value has a lift between 4 millimeters and 5 millimeters when the crank angle is 0°.

12. The system of claim 8, wherein the valve timing overlap begins when the crank angle is 0°.

13. The system of claim 8, wherein the at least one combustion event sensor comprises at least one knock sensor.

14. The system of claim 8, wherein the at least one combustion event sensor comprises at least one cylinder pressure sensor.

15. A vehicle comprising:

at least one processor; and at least one memory communicatively coupled to the at least one processor, the at least one memory comprising instructions that upon execution by the at least one processor, causes the at least one processor to:

receive combustion event data from at least one combustion event sensor associated with a plurality of cylinders, wherein each of the plurality of cylinders comprises:

a combustion chamber;

an intake valve configured to be placed in one of an open position to enable a first flow of air from an intake manifold to the combustion chamber and a closed position to disable the first flow of air from the intake manifold to the combustion chamber; and an exhaust valve configured to be placed in one of an open position to enable a second flow of air from the combustion chamber to an exhaust manifold and a closed position to disable the second flow of air from the combustion chamber to the exhaust manifold; and based on a determination that a Stochastic Pre-Ignition (SPI) event has occurred in at least one of the plurality of cylinders based on the combustion event data;

issue a first command to a variable valve timing (VVT) system to implement a valve timing overlap for each of the plurality of cylinders and maintain the valve timing overlap during twenty consecutive 360° crankshaft rotations of a crankshaft of a vehicle, wherein:

the intake valve and the exhaust valve of the cylinder are simultaneously placed in the open positions during the valve timing overlap;

an inducted air volume enters the combustion chamber of each of the plurality of cylinders from the intake manifold via the associated intake valve and a bypass portion of the inducted air volume passes through the combustion chamber into the exhaust manifold via the associated exhaust valve during the valve timing overlap; and a timing of the exhaust valve is adjusted to a retarded phase having a crank angle of −160° and a maximum lift between 8 millimeters and 9 millimeters to enable a valve overlap having a lift of less than 1 millimeter;

issue a second command to the VVT system to close the exhaust valve of each of the cylinders following the valve timing overlap causing a trapped portion of the inducted air volume to remain in the combustion chamber of the cylinder, wherein the trapped portion of the inducted air volume is less than a default air volume used during a normal combustion process;

issue a third command to a fuel injection system to inject a default fuel amount associated with the normal combustion process into the combustion chambers of each of the cylinders, wherein a combination of the trapped portion of the inducted air volume and the default fuel amount creates a rich air-fuel mixture, the rich air-fuel mixture being richer than a default air-fuel mixture created by a combination of the default air volume and the default fuel amount used during the normal combustion process;

issue a fourth command to the VVT system to open the exhaust valve of each of the cylinders following combustion of the rich air-fuel mixture in the combustion chamber of the cylinder to enable exhaust gases generated by the combustion of the rich air-fuel to flow from the combustion chamber into the exhaust manifold via the associated exhaust valve and combine with the bypass portion of the inducted air volume generated by at least one of the plurality of cylinders in the exhaust manifold to create a stoichiometric exhaust gas composition;

receive updated combustion event data from the at least one combustion event sensor following the twenty consecutive 360° crankshaft rotations;

determine whether the SPI event has been resolved based on the updated combustion event data; and issue a fifth command to the VVT system to gradually transition from the valve timing overlap to a default timing associated with a normal combustion process over a pre-defined number of consecutive crankshaft rotations based on the determination.

16. The vehicle of claim 15, wherein, the timing of the exhaust valve is adjusted from a crank angle falling within a range of −260° to −210° to the retarded phase having the crank angle of −160°.

17. The vehicle of claim 15, wherein the adjusted exhaust value has the maximum lift between 8 millimeters and 9 millimeters when the crank angle is −60°.

18. The vehicle of claim 15, wherein the adjusted exhaust value has a lift between 4 millimeters and 5 millimeters when the crank angle is 0°.

19. The vehicle of claim 15, wherein the valve timing overlap begins when the crank angle is 0°.

20. The vehicle of claim 15, wherein the at least one combustion event sensor comprises one of at least one knock sensor and at least one cylinder pressure sensor.

* * * * *